(12) United States Patent
Isogai

(10) Patent No.: US 7,416,801 B2
(45) Date of Patent: Aug. 26, 2008

(54) WARMING DEVICE FOR FUEL CELL SYSTEM

(75) Inventor: Yoshihiro Isogai, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 662 days.

(21) Appl. No.: 10/816,986

(22) Filed: Apr. 2, 2004

(65) Prior Publication Data

US 2004/0219409 A1   Nov. 4, 2004

(30) Foreign Application Priority Data

Apr. 7, 2003   (JP) .............................. 2003-103312

(51) Int. Cl.
*H01M 8/04* (2006.01)

(52) U.S. Cl. .............................. 429/26; 429/13; 429/120

(58) Field of Classification Search .................. 429/26, 429/120; 903/908, 944
See application file for complete search history.

(56) References Cited

U.S. PATENT DOCUMENTS 6,392,388 B1 *   5/2002  Young .......................... 320/150

FOREIGN PATENT DOCUMENTS

| FR | 2813994 A1 * | 3/2002 |
| JP | 03-272567 | 12/1991 |
| JP | 63-091967 | 4/1998 |
| JP | 11301285 A * | 11/1999 |
| JP | 2002-093445 | 3/2002 |

* cited by examiner

*Primary Examiner*—Gregg Cantelmo
(74) *Attorney, Agent, or Firm*—Morgan & Finnegan, LLP

(57) ABSTRACT

A warming device for fuel cell system having a fuel battery and a secondary battery has a first heater, a second heater and a control device. The first heater heats the secondary battery. The second heater heats the fuel battery by using electricity of the secondary battery. In warming of the fuel cell system, the control device first drives the first heater to heat the secondary battery to a preset temperature, and then drives the second heater. This reduces warming time of the fuel cell system.

16 Claims, 4 Drawing Sheets

WARMING DEVICE FOR FUEL CELL SYSTEM

BACKGROUND OF THE INVENTION

The present invention relates to a warming device for a fuel cell system having a fuel battery and a power storage device.

In recent years, attention is being given to fuel cells, which are clean and provide high energy efficiency, as power sources for electric vehicles. A fuel battery produces an electromotive force by a chemical reaction of oxygen with hydrogen. Oxygen is supplied to a cathode, and hydrogen is supplied to an anode, and chemical energy obtained by the reaction of oxygen with hydrogen is directly converted into electric energy, thus providing high conversion efficiency.

For use in a fuel cell vehicle, a compact fuel battery with high output is required, and a polymer electrolyte fuel cell (PEFC) is preferably used. The polymer electrolyte fuel cell efficiently generates electric power at a preset temperature (about 80° C.). Since a reaction that produces heat occurs in the fuel battery, efficient power generation can be continued even at a low ambient temperature after a lapse of predetermined time from a start of power generation. However, if the temperature is low (for example, 0° C. or less) at the start of the power generation, power cannot be generated or is inefficiently generated.

Water generated in the fuel battery is generally discharged together with unreacted gas. However, generated water sometimes remains in a gas passage when the fuel battery is stopped. If an outside air temperature is 0° C. or less, which is a freezing point of water, in a cold district, water remaining in the gas passage may freeze to block the gas passage, thus preventing flow of fuel gas. This prevents the fuel battery from being activated.

At a low temperature, moisture in an electrolyte membrane of the polymer electrolyte fuel cell may freeze, which may prevent power generation or significantly reduce power generation efficiency. Even at a temperature that causes no freeze of water, the polymer electrolyte fuel cell generally generates power at the preset temperature, and thus requires quick warming on a cold day.

For example, Japanese Laid-Open Patent Publication No. 63-91967 discloses a method for heating a fuel battery main body and a storage battery in a power supply device including a fuel battery and the storage battery in combination, by detecting a temperature in a housing container in which the fuel battery main body and the storage battery are placed, and energizing a heater for heating the inside of the housing container from the storage battery when the detected temperature is below a set value. The Laid-Open Japanese Patent Publication No. 63-91967 also discloses a method for energizing a heater for heating the fuel battery when the temperature in the housing container is between −15° C. and −5° C., inclusive, and energizing a heater for heating the fuel battery and a heater for heating the storage battery when the temperature in the housing container is −15° C. or less.

For example, Japanese Laid-Open Patent Publication No. 3-272567 discloses a hybrid fuel battery in which a fuel battery and a storage battery are combined and connected to the same load, and a temperature of the storage battery is kept within a predetermined range in order to prevent reduction in capacity of the storage battery at a low temperature. The hybrid fuel battery includes a temperature sensor provided in the storage battery for detecting the temperature of the storage battery, a heating device for heating by remaining heat or electricity generated by the fuel battery, and a control part that controls the heating device so as to keep the temperature of the storage battery within the predetermined range based on the temperature detected by the temperature sensor.

As a warming method of a fuel battery, for example, Japanese Laid-Open Patent Publication No. 2002-93445 discloses a method in which a temperature detection device for detecting a temperature of the fuel battery, and an air heating device for heating air to be supplied to an air electrode of a fuel cell are provided, and the air heating device is actuated when the temperature of the fuel cell is a preset temperature or less. The air heating device includes a heater to which power is supplied from a storage battery.

In the method disclosed in Japanese Laid-Open Patent Publication No. 63-91967, the fuel battery and the storage battery (secondary battery) are heated by the heater actuated (driven) by the power from the storage battery, and the heater is actuated without the storage battery being preheated. However, a secondary battery incorporated in a fuel cell vehicle produces high output at a normal temperature (a temperature that requires no warming), but remains producing low output at a low temperature that requires warming. Therefore, if the method described in Japanese Laid-Open Patent Publication No. 63-91967 is applied to warming of a fuel cell vehicle, the heater is energized in a low output state of the secondary battery to warm the fuel battery and the secondary battery, which takes much time.

In the hybrid fuel battery disclosed in Japanese Laid-Open Patent Publication No. 3-272567, the heating device is controlled to detect the temperature of the storage battery by the temperature sensor and keep the temperature of the storage battery within the predetermined range. However, the heating device is heated by the remaining heat or the electricity generated by the fuel battery, which requires the fuel battery being always actuated. Therefore, when the hybrid fuel battery is applied to the case where warming is required at a low temperature such as the case of a fuel cell vehicle used in a cold area, power generation by the fuel battery for warming is required even during the fuel cell vehicle being not used.

In the warming method described in Japanese Laid-Open Patent Publication No. 2002-93445, the fuel cell is heated by the heater to which the power is supplied from the storage battery when the temperature of the fuel cell is the preset temperature or less. In this case, no consideration is given to low output of the storage battery at a low temperature, and warming takes much time as in Japanese Laid-Open Patent Publication No. 63-91967.

SUMMARY OF THE INVENTION

An object of the invention is to provide a warming device for a fuel cell system capable of reducing warming time of the fuel cell system as compared with the case where an electric heater is energized with a temperature of a storage battery (secondary battery) kept low in warming to heat a fuel battery.

To achieve the foregoing and other objectives and in accordance with the purpose of the present invention, a warming device for fuel cell system having a fuel battery and a power storage device is provided. The warming device includes a first heating device, a second heating device, and a control device. The first heating device heats the power storage device. The second heating device heats the fuel battery by using electricity of the power storage device. In warming of the fuel cell system, the control device first drives the first heating device to heat the power storage device to a preset temperature, and then drives the second heating device.

In another aspect of the present invention, a method for controlling a warming device for a fuel cell system having a fuel battery and a power storage device is provided. The method includes: heating the power storage device to a preset temperature by using a first heating device in warming of the fuel cell system; and heating the fuel battery with a second heating device by using electricity of the power storage device after a temperature of the power storage device reaches the preset temperature.

The present invention also provides a fuel cell vehicle that has a fuel cell system having a fuel battery, a power storage device, and a warming device. The warming device includes a first heating device, a second heating device, and a control device. The first heating device heats the power storage device. The second heating device heats the fuel battery by using electricity of the power storage device. In warming of the fuel cell system, the control device first drives the first heating device to heat the power storage device to a preset temperature, and then drives the second heating device.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A fuel cell vehicle according to a first embodiment of the present invention will now be described with reference to FIGS. 1 to 4.

Figure 1:
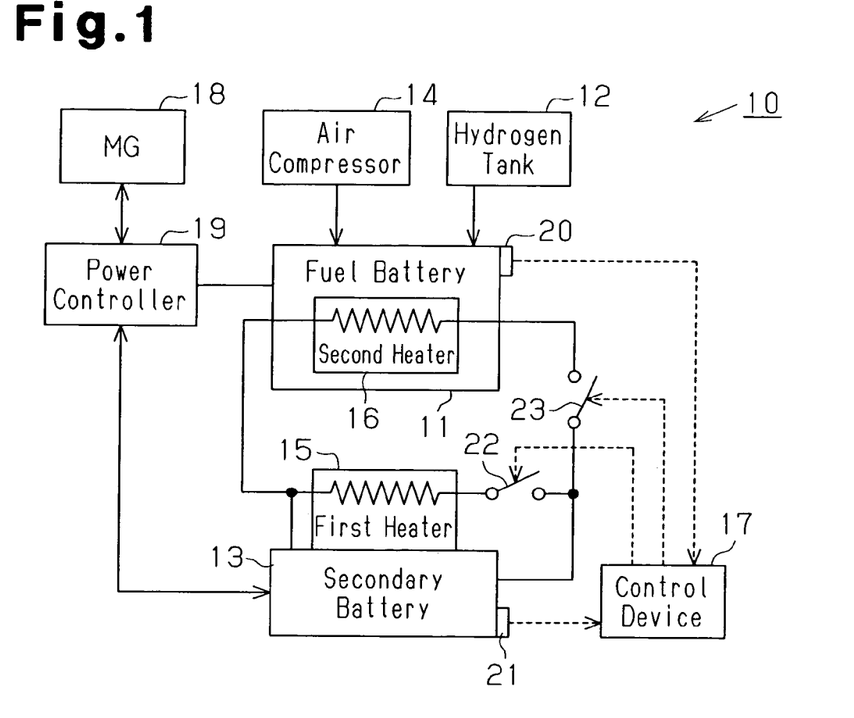
FIG. 1 is a schematic view of a configuration of a fuel cell system according to a first embodiment of the invention.

As shown in FIG. 1, a fuel cell system 10 includes a fuel battery 11, a hydrogen tank 12 as a hydrogen source, a secondary battery 13 as a power storage device, an air compressor 14 as an oxygen supply source, a first heater 15 as a first heating device, a second heater 16 as a second heating device, and a control device 17. The fuel cell system 10 includes a motor generator 18 and a power controller 19 that drive wheels (not shown) of the fuel cell vehicle.

The fuel battery 11 is, for example, of a polymer electrolyte type, and generates electric energy (DC power) by a reaction of hydrogen supplied from the hydrogen tank 12 with oxygen supplied from the air compressor 14. The hydrogen tank 12 stores hydrogen at a high pressure, for example, of about 35 Mpa, depressurizes the hydrogen therein, and then supplies the hydrogen to the fuel battery 11 at a constant pressure.

A nickel metal hydride battery is used as the secondary battery 13. The secondary battery 13 stores (charges) regeneration energy at deceleration or dump power generated in the fuel battery 11 to assist in output of the fuel battery 11 at acceleration. The secondary battery 13 has a capacity that allows charging of power required for supplying an amount of heat required for heating the secondary battery 13 itself to a preset temperature and an amount of heat required for heating the fuel battery 11 to a temperature that allows power generation via the first heater 15 and the second heater 16 at least in warming.

A synchronous motor is used as the motor generator 18, and functions as a generator at deceleration.

The power controller 19 controls output of the fuel battery 11 and charging and discharging of the secondary battery 13. Specifically, the fuel battery 11 and the secondary battery 13 supply power to the motor generator 18 via the power controller 19. The power controller 19 includes an inverter, and causes the motor generator 18 to function as a generator at deceleration, thereby converting AC power generated by the motor generator 18 into DC power to be charged into the secondary battery 13. The power controller 19 converts DC power output from the fuel battery 11 and the secondary battery 13 into AC power by the inverter to be supplied to the motor generator 18 at acceleration, and causes the motor generator 18 to function as a motor to drive the drive wheels. When dump power is generated in the fuel battery 11 according to driving conditions, the power controller 19 charges the dump power in the fuel battery 11 into the secondary battery 13.

The fuel battery 11 includes a first temperature sensor 20 as a temperature detection device for detecting a temperature of the fuel battery 11. The first temperature sensor 20 is electrically connected to the control device 17. The control device 17 identifies the temperature of the fuel battery 11 based on detection signals from the first temperature sensor 20 to determine whether warming is required or not.

The secondary battery 13 includes a second temperature sensor 21 for detecting a temperature in the secondary battery 13. The second temperature sensor 21 is electrically connected to the control device 17. The control device 17 identifies the temperature of the secondary battery 13 based on detection signals from the second temperature sensor 21.

In warming the fuel battery 11, the control device 17 controls the first heater 15 and the second heater 16 so as to first drive the first heater 15 to heat the secondary battery 13 to the preset temperature, and then drive the second heater 16. The preset temperature is 0° C. in the embodiment. The first heater 15 and the second heater 16 are connected in parallel to the secondary battery 13, and energization is controlled according to on/off of relays 22, 23 controlled by the control device 17. In the embodiment, the first heater 15, the second heater 16, and the control device 17 constitute a warming device.

Figure 2:
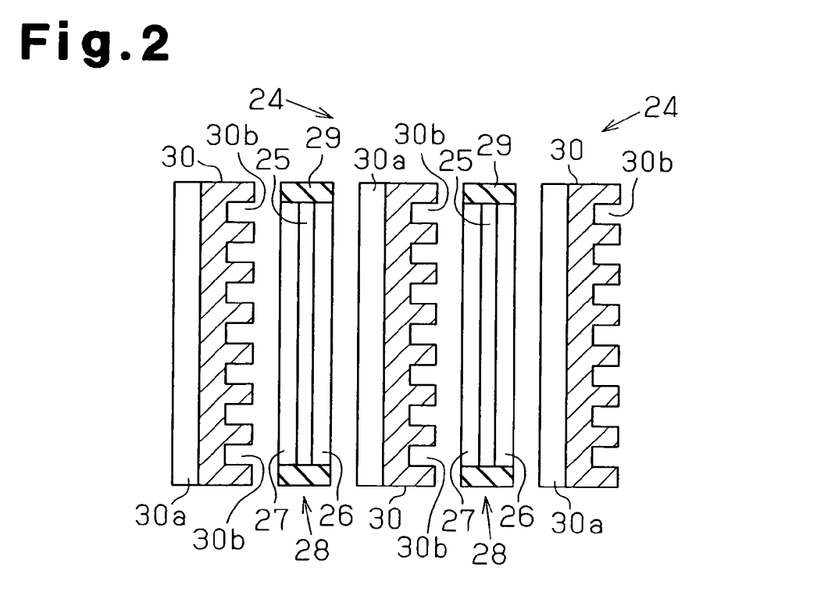
FIG. 2 is a diagrammatic cross-sectional view of a fuel cell included in the fuel cell system in FIG. 1.

A number of fuel cells 24 are connected in series in the fuel battery 11. As shown in FIG. 2, each fuel cell 24 includes an electrode unit 28 including an electrolyte membrane (ion exchange membrane) 25, an anode electrode 26 as a hydrogen electrode, a cathode electrode 27 as an oxygen electrode, and a gasket 29, and a pair of separators 30. The electrolyte membrane 25 is provided so as to be sandwiched between the anode electrode 26 and the cathode electrode 27. With the electrolyte membrane 25 sandwiched between the anode electrode 26 and the cathode electrode 27, the gasket 29 is provided outside thereof. One of the pair of separators 30 has, in its surface, a groove 30a through which hydrogen gas passes, and the other of the separators 30 has, in its surface, a plurality of grooves 30b through which air passes. The grooves 30a and 30b are formed so as to extend orthogonally to each other. The electrode unit 28 and the pair of separators 30 that constitute the fuel cell 24 are alternately placed and fastened by an through bolt (not shown) to form a stack of the fuel battery 11.

The second heater 16 is mounted to the fuel battery 11 along the length of the fuel battery 11. A plurality of second heaters 16 may be provided, and in this case, each second heater 16 is placed for each corresponding fuel cell 24.

Since the fuel battery 11 produces heat during power generation, an unshown cooling passage is formed in order to keep the temperature of the fuel battery 11 at about 80° C. Cooling water cooled by a radiator circulates in the cooling passage by a water pump.

Next, operations of the fuel cell system 10 configured as above will be described.

When the temperature of the fuel battery 11 is less than the temperature that allows power generation of the fuel battery 11, power generation of the fuel battery 11 is started after warming. When the temperature of the fuel battery 11 is the temperature that allows power generation or higher, power generation of the fuel battery 11 is started without warming.

The motor generator 18 is driven by power supplied from the fuel battery 11 and the secondary battery 13, and the fuel cell vehicle drives by the drive force. The power controller 19 determines according to a predetermined program whether power is supplied only from the fuel battery 11 or from both the fuel battery 11 and the secondary battery 13, or charged into the secondary battery 13, depending on drive conditions such as acceleration and deceleration. The power controller 19 controls to supply power from the fuel battery 11 and the secondary battery 13 when a large amount of power is required such as at acceleration, and supply power only from the fuel battery 11 in other cases. At deceleration (braking), the power controller 19 causes the motor generator 18 to function as a generator, and controls the inverter to convert the regeneration energy into electricity to be charged into the secondary battery 13.

The polymer electrolyte fuel cell efficiently generates power at about 80° C. Since a chemical reaction of the hydrogen with oxygen produces heat, continued power generation increases the temperature of the fuel battery 11 higher than the appropriate temperature of about 80° C. by reaction heat. In order to prevent this increase in the temperature, the cooling water cooled by the radiator circulates in the cooling passage.

Next, warming will be described. When a switch (not shown) of the fuel cell system 10 is turned on, the control device 17 determines whether the temperature is low enough to require warming based on the detection signals from the temperature sensor 20. If warming is not required, power generation of the fuel battery 11 is started. On the other hand, when the control device 17 determines that the temperature is low enough to require warming, warming is performed before the power generation of the fuel battery 11 is started.

In warming, in order to first energize the first heater 15, an instruction signal to keep a relay 22 on is output to turn on the relay 22, and the first heater 15 is energized to heat the secondary battery 13. When the control device 17 determines that the temperature of the secondary battery 13 reaches the preset temperature based on the output signal from the second temperature sensor 21, an instruction signal to keep the relay 22 off and keep a relay 23 on is output. Then, the relay 23 is turned on, and the second heater 16 is energized to heat the fuel battery 11. When the control device 17 detects by the detection signals from the temperature sensor 20 that the temperature of the fuel battery 11 reaches the temperature that allows power generation, the control device 17 outputs a first signal of an instruction to turn off the relay 23, and a second signal of an instruction to start power generation of the fuel battery 11. Based on the second signal, the power generation of the fuel battery 11 is started. Specifically, hydrogen is supplied from the hydrogen tank 12 to the fuel battery 11, and the air compressor 14 is driven to supply air to the fuel battery 11. The circulation of the cooling water in the radiator is started after the temperature of the fuel battery 11 reaches the appropriate temperature.

The power generated by the fuel battery 11 is charged into the secondary battery 13 for the next warming. Then, when the amount of charge of the secondary battery 13 reaches a predetermined value or higher, the charging into the secondary battery 13 is stopped to start driving the fuel cell vehicle.

Figure 3A:
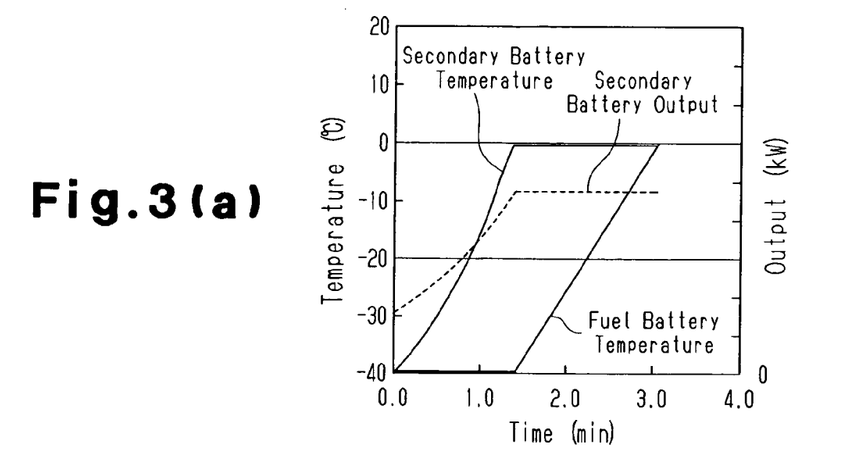
FIG. 3(a) is a graph of changes in fuel battery temperature and secondary battery output of the embodiment.
Figure 3B:
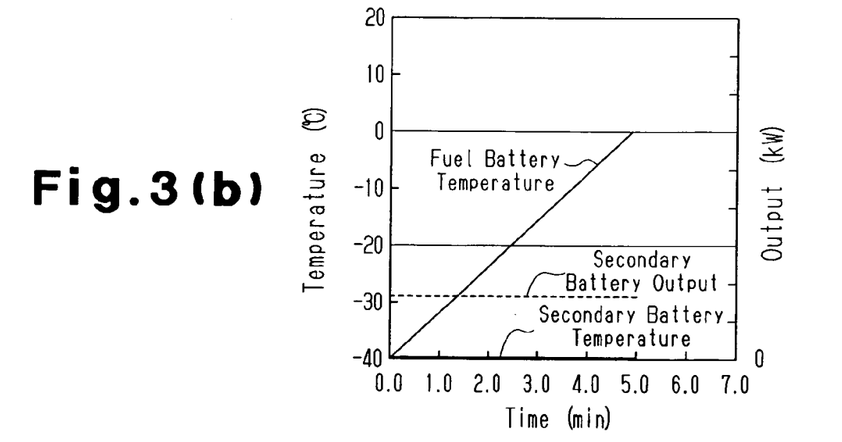
FIG. 3(b) is a graph of changes in fuel battery temperature and secondary battery output of the prior art.

FIG. 3(a) shows changes in temperatures of the fuel battery 11 and the secondary battery 13 and a change in output of the secondary battery 13 when the above described warming method is performed at an ambient temperature of −40° C. and temperatures of the fuel battery 11 and the secondary battery 13 of −40° C. FIG. 3(b) of the related art shows changes in temperatures of the fuel battery 11 and the secondary battery 13 and a change in output of the secondary battery 13 when the second heater 16 is energized from the start without heating the secondary battery 13 to heat the fuel battery 11 at the same ambient temperature and the same temperatures of the fuel battery 11 and the secondary battery 13.

The nickel metal hydride battery used as the secondary battery 13 produces low output at a low temperature that requires warming. When the secondary battery 13 is not heated, as shown in FIG. 3(b), the temperature of the secondary battery 13 is kept at −40° C. during warming, and the output of the secondary battery 13 is kept constant at a low value. Then, the temperature of the fuel battery 11 increases constantly by a predetermined rate corresponding to the output of the secondary battery 13, and it takes about five minutes to reach 0° C.

On the other hand, as shown in FIG. 3(a), according to the warming method of the invention in which the secondary battery 13 is heated and then the fuel battery 11 is heated, the output of the secondary battery 13 increases with the increase in temperature of the secondary battery 13. Although a start of heating the fuel battery 11 lags, the output of the secondary battery 13 in heating the fuel battery 11 is about three times higher than that at −40° C., thus reducing time required for heating the fuel battery 11 to the temperature that allows power generation (for example, 0° C.). As a result, the temperature of the fuel battery 11 reaches 0° C. in about three minutes including heating time of the secondary battery 13 after the warming is started. Specifically, warming time can be reduced by about 60% as compared with the warming method in which the second heater 16 only is driven from the start to heat the fuel battery 11 only without heating the secondary battery 13 in warming.

Figure 3C:
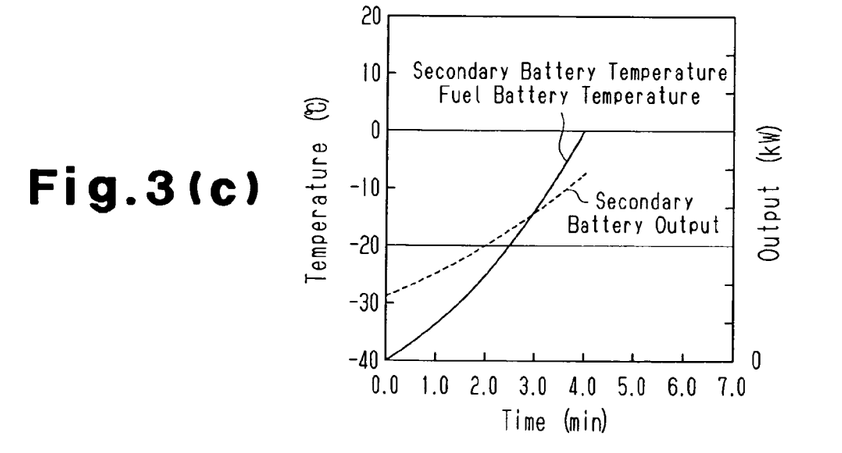
FIG. 3(c) is a graph of changes when the fuel battery and the secondary battery are heated at the same time from a start of warming (prior art)

FIG. 3(c) shows changes in temperatures of the fuel battery 11 and the secondary battery 13 and a change in output of the secondary battery 13 when the fuel battery 11 and the secondary battery 13 are heated at the same time from the start of warming at the ambient temperature of −40° C. and the temperatures of the fuel battery 11 and the secondary battery 13 of −40° C. As shown in FIG. 3(c), it takes about four minutes for the temperature of the fuel battery 11 to reach 0° C.

Figure 4:
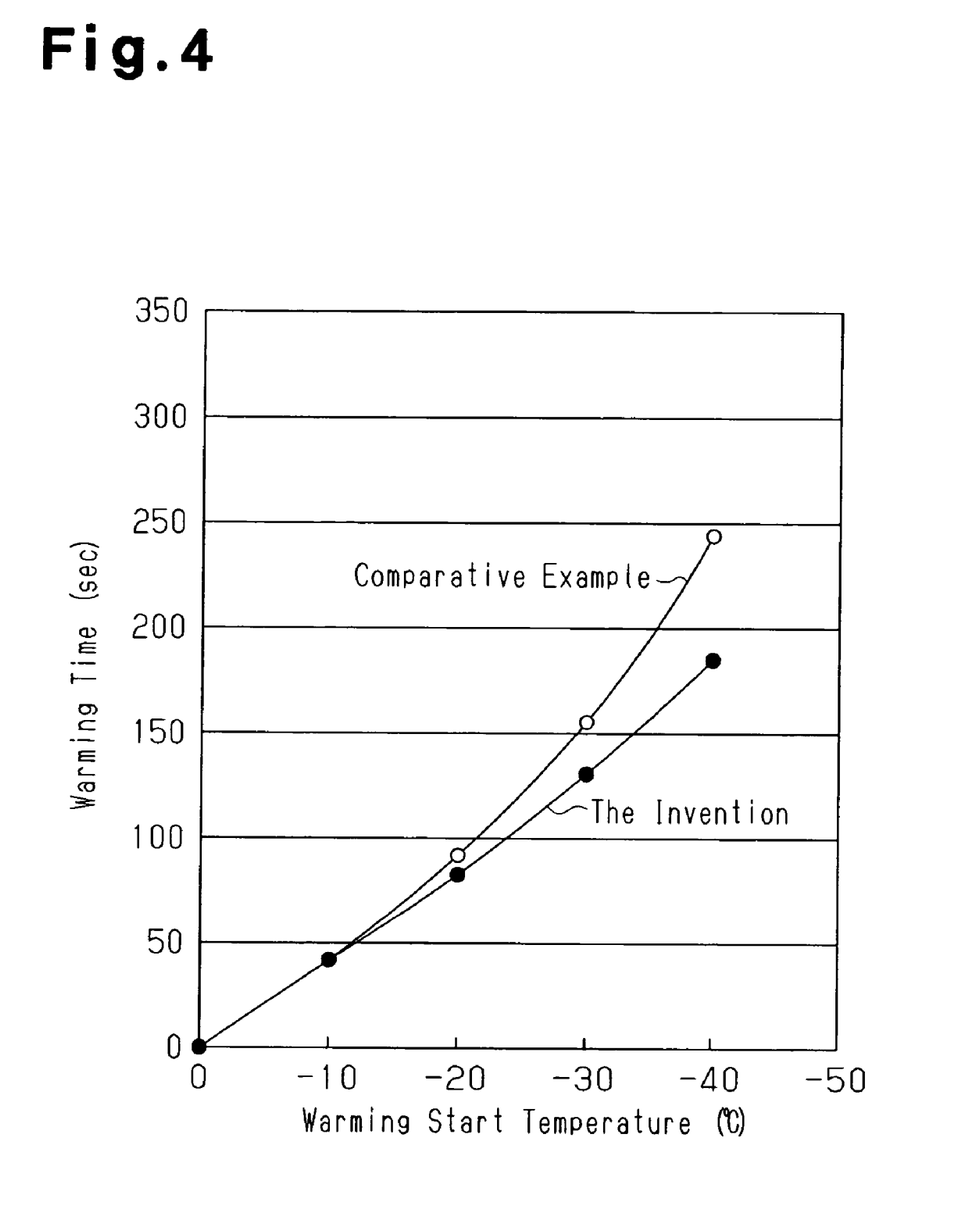
FIG. 4 is a graph of a relationship between warming start temperature and necessary warming time.

FIG. 4 shows a relationship between the warming start temperature, which means the ambient temperature and the temperatures of the fuel battery 11 and the secondary battery 13 when the warming is started, and the warming time until the fuel battery 11 reaches 0° C., for the warming method according to the invention, and for the warming method for heating the fuel battery 11 and the secondary battery 13 at the same time from the start of warming as a comparative example.

The results in FIG. 4 reveals that there is no difference in warming time between the warming method for heating the fuel battery 11 and the secondary battery 13 from the start of warming and the warming method according to the invention, within a temperature range at the start of warming from 0° C. to −10° C., but the warming time of the warming method according to the invention is shorter when the warming start temperature is −10° C. or less.

The embodiment has the following advantages.

(1) The warming device includes the first heater 15 for heating the secondary battery 13 by the power of the secondary battery 13, the second heater 16 for heating the fuel battery 11 by the power of the secondary battery 13, and the control device 17 that first drives the first heater 15 to heat the secondary battery 13 to the preset temperature, and then drives the second heater 16 in warming. Therefore, the warming time of the fuel cell system is reduced as compared with the method for heating the fuel battery 11 without heating the secondary battery 13.

(2) The warming method according to the invention allows warming in reduced time if the warming start temperature is −10° C. or less as compared with the warming method for driving the first heating device and the second heating device at the same time to heat the fuel battery 11 and the secondary battery 13.

(3) Since the fuel battery 11 is heated until the temperature of the fuel battery 11 reaches 0° C., even frozen moisture, if any, in the gas passage of the fuel battery 11 can be removed.

(4) Since the first heater 15 and second heater 16 used as the first heating device and the second heating device are electric heater, the heating devices are safe and simple in structure as compared with heating devices that burns hydrogen or other fuels.

(5) The warming method according to the invention can be readily implemented by providing the first heating device for heating the secondary battery 13 in the conventional warming device for heating the fuel battery 11 using the power of the secondary battery 13 from the start of warming.

(6) When the power generation of the fuel battery 11 is started after the warming, and the amount of power stored in the secondary battery 13 is below the predetermined amount, the power generated by the fuel battery 11 is charged into the secondary battery 13 until the predetermined amount is reached. Therefore, a lack of power of the secondary battery 13 in the next warming is avoided.

(7) After the warming is finished, the circulation of the cooling water in the fuel battery 11 is not started at the same time as the start of the power generation of the fuel battery 11, but the circulation of the cooling water is started after the temperature of the fuel battery 11 reaches 80° C. Therefore, the time until the temperature of the fuel battery 11 reaches the temperature appropriate for the power generation of the fuel battery 11 is reduced as compared with the case where the circulation of the cooling water is started at the same time as the start of the power generation of the fuel battery 11.

(8) Since the warming method according to the invention is applied to the fuel cell system 10 that drives the motor of the fuel cell vehicle, the fuel cell vehicle is warmed in shorter time than by conventional methods.

Next, a second embodiment of the invention will be described with reference to FIG. 5. This embodiment is different from the embodiment in FIGS. 1 to 4 in that only a part of a fuel battery 11 can generate power, a second heater 16 can heat only the part of the fuel battery 11, and when the part of the fuel battery 11 reaches a temperature that allows power generation, power generation of the part of the fuel battery 11 is started.

Figure 5:
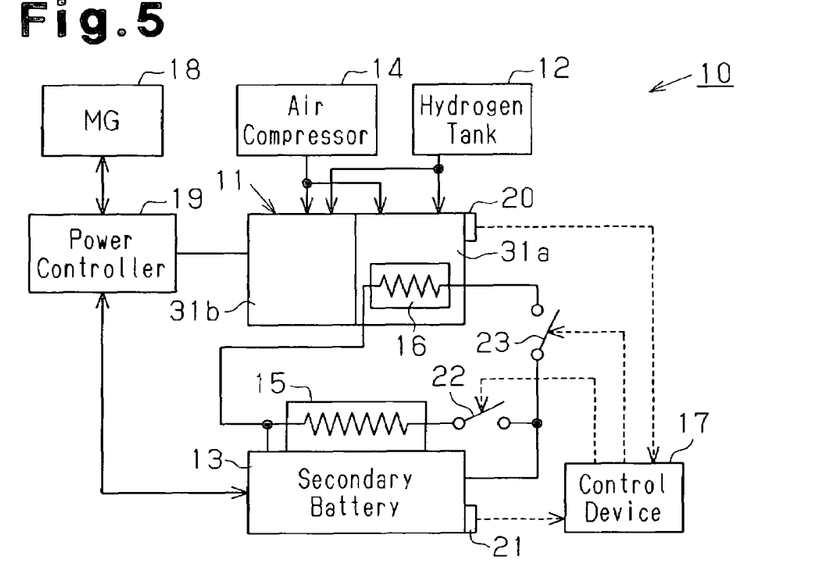
FIG. 5 is a schematic view of a configuration of a fuel cell system according to a second embodiment of the invention.

As shown in FIG. 5, the fuel battery 11 is divided into two cell units 31a and 31b. The cell units 31a and 31b are independent from each other. A fuel cell vehicle requires some hundreds of fuel cells 24 electrically connected in series as a fuel battery 11 for generating required power. However, if the fuel battery 11 is constituted by a stack with some hundreds of fuel cells 24 connected linearly, the fuel battery 11 becomes long to make it difficult to ensure a space for the fuel battery 11. Thus, the fuel battery 11 is constituted by the two cell units 31a and 31b with, for example, half of all the fuel cells 24 connected linearly. Although all the fuel cells 24 are electrically connected in series, oxygen or hydrogen is supplied to each of the cell units 31a and 31b. For example, a change-over valve (not shown) is provided for each of a duct for supplying hydrogen from a hydrogen tank 12 to the cell units 31a and 31b, and a duct for supplying air from an air compressor 14 to the cell units 31a and 31b. Then, the change-over valve is operated to change between a state of supplying hydrogen and air to the cell unit 31a only, and a state of supplying hydrogen and air to both the cell units 31a and 31b. The second heater 16 is provided so as to heat one cell unit 31a only.

For the fuel cell vehicle, the output of the fuel battery 11 is twice or more the output of the secondary battery 13, and the heat capacity of the fuel battery 11 is at least twice the heat capacity of the secondary battery 13 though it depends on the size of the fuel battery. Then, after power generation of a half of the fuel battery 11 is started, the rest of the fuel battery 11 can be heated to the temperature that allows power generation by an amount of heat produced by the fuel battery 11.

A control device 17 first energizes a first heater 15 in warming, and after a secondary battery 13 reaches a preset temperature, the energization of the first heater 15 is stopped to energize the second heater 16. After the cell unit 31a, that is, the half of the fuel battery 11 reaches the temperature that allows power generation, power generation of the part is started. Then, the control device 17 controls to stop the energization of the second heater 16. Power generated by the power generation in the fuel battery 11 is charged into the secondary battery 13.

In this embodiment, the second heater 16 does not warm the entire fuel battery 11 to the temperature that allows power generation, but warms the half, that is, the cell unit 31a. Then, after the half of the fuel battery 11 reaches the temperature that allows power generation, the energization of the second heater 16 is stopped to stop discharge of the secondary battery 13 and start power generation by the half of the fuel battery 11, and heat generated during the power generation of the fuel battery 11 is used to warm the fuel battery 11. The power generated by the fuel battery 11 is charged into the secondary battery 13.

This embodiment has the following advantages in addition to the same advantages as (1) to (8) of the embodiment in FIGS. 1 to 4.

(9) The second heater 16 for heating the fuel battery 11 using the power of the secondary battery 13 in warming does not heat the entire fuel battery 11 to the temperature that allows power generation, but heats the half of the fuel battery 11 to the temperature that allows power generation. Therefore, a discharge capacity of the secondary battery 13 required in warming is reduced, and the amount of power charged into the secondary battery 13 after the warming is finished in preparation for the next warming is reduced. As a result, an amount of hydrogen used in power generation required for charging in preparation for the next warming can be reduced, and for the fuel cell vehicle, a drive distance is extended with hydrogen once filled in the hydrogen tank 12.

(10) Since power generation is started in the cell unit 31*a* that has reached the temperature that allows power generation before the entire fuel battery 11 reaches the temperature that allows power generation, and the generated power is charged into the secondary battery 13, the amount of power charged into the secondary battery 13 in preparation for the next warming is reduced to reduce charging time.

(11) Since the fuel battery 11 is configured with the plurality of cell units 31*a* and 31*b* placed in parallel, the space for the fuel battery 11 is easily ensured for the fuel cell vehicle.

It should be apparent to those skilled in the art that the present invention may be embodied in many other specific forms without departing from the spirit or scope of the invention. Particularly, it should be understood that the invention may be embodied in the following forms.

Figure 6:
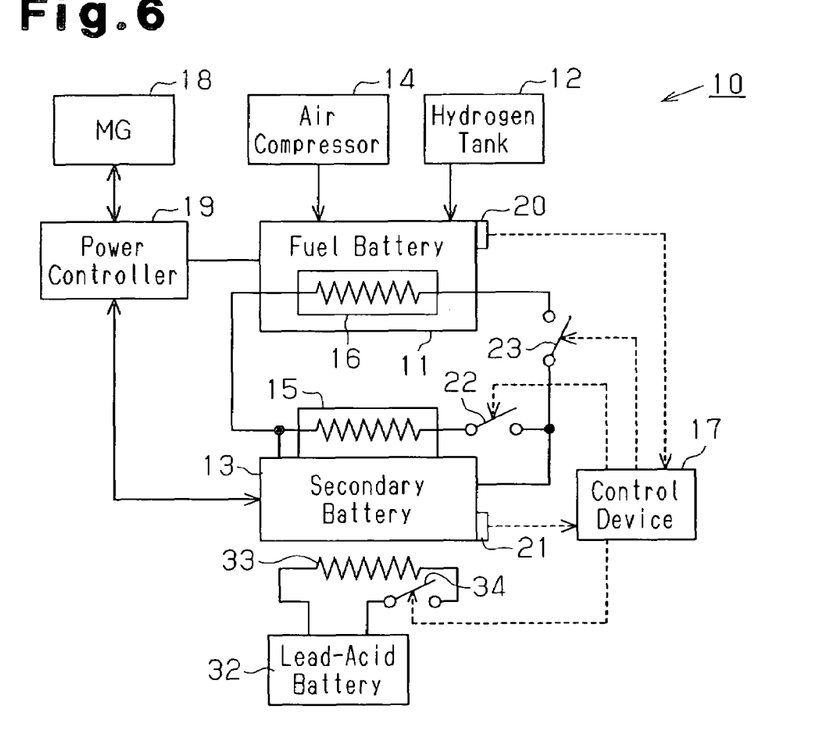
FIG. 6 is a schematic view of a configuration of a fuel cell system according to another embodiment of the invention.

In addition to the first heater 15 as a main heating body driven by the power of the secondary battery 13 itself as means for heating the secondary battery 13 as a power storage device, auxiliary heating body for heating the secondary battery 13 by energy other than the secondary battery 13 may be provided. For example, as shown in another embodiment in FIG. 6, a heater 33 connected to a storage battery, which is a lead-acid battery 32 having a better output property at a low temperature than the secondary battery 13, is provided as auxiliary heating device. Energization of the heater 33 is controlled by on/off of a relay 34 controlled by a control device 17. The control device 17 turns on a relay 22 and the relay 34 in warming to heat a secondary battery 13 by a first heater 15 and the heater 33. When a secondary battery 13 having a low output property at a low temperature such as a nickel metal hydride battery is used as a power storage device, heating to a preset temperature by its own power takes much time. Heating the power storage device (secondary battery 13) by the auxiliary heating body can reduce time for heating the power storage device to the preset temperature and reduce warming time of a fuel cell system 10.

A fuel cell vehicle includes a lead-acid battery for supplying power to electrical equipment of the vehicle besides a secondary battery 13 for supplying drive power to a drive motor, and thus auxiliary heating device can be easily configured by using the lead-acid battery and simply adding a heater 33.

When the auxiliary heating body is provided to heat the secondary battery 13 to the preset temperature, the method is not limited to energization of the first heater 15 and the heater 33 at the same time from the start. For example, the heater 33 may only be first energized and then the first heater 15 may be energized for heating by both the heaters 15 and 33, or the heater 33 only may be first energized and then the first heater 15 only may be energized.

In the embodiments in FIGS. 1 to 6, the secondary battery 13 and the lead-acid battery 32 may be connected in parallel to the first heater 15 without adding the heater 33. The control device 17 controls to energize the first heater 15 from the lead-acid battery 32 during an initial stage of warming, and then energize from the secondary battery 13 after the temperature of the secondary battery 13 reaches a preset temperature.

Auxiliary heating body using no power but using heat such as combustion heat may be provided. For example, hydrogen or methanol may be burned to use the combustion heat. Instead of the combustion heat, heat when hydrogen is absorbed by an hydrogen absorbing alloy may be used.

The first heating device and the second heating device are not limited to devices for directly heating a power storage device (secondary battery 13) or a fuel battery by an electric heater using power of the power storage device.

For example, a heating medium may be heated by an electric heater to heat a power storage device or a fuel battery via the heated heating medium. As the heating medium, air may be used instead of a liquid to blow hot air heated by the heater on the power storage device or the fuel battery by a fan for heating. A heater may be provided in an outlet of a blower that injects air toward the power storage device or the fuel battery.

When the power storage device or the fuel battery is heated using the power of the power storage device (secondary battery 13), no electric heater may be used. For example, air heated by heat of compression of a compressor may be used. An air compressor 14 is used as the compressor to branch a pipe for feeding compressed air to the secondary battery 13 from a pipe of the compressor, and provide a change-over valve to change between a state where the compressed air can be supplied only to the secondary battery 13 and a state where the compressed air can be supplied only to the fuel battery 11. A viscous fluid heater may be used in which a heating chamber and a heat radiation chamber are provided in a housing, a rotor operatively connected to a drive shaft is rotated in the heating chamber containing a viscous fluid to produce heat based on shear action of the viscous fluid, and the heat is transferred to a circulation fluid flowing in the heat radiation chamber. When a heating medium is used for warming, a pipe of the heating medium is desirably as short as possible.

A long pipe requires extra energy for heating a heating medium in the pipe and for radiating heat from the pipe.

The fuel battery 11 and the secondary battery 13 generally have cooling device in order to restrain increase in temperature by heating during power generation other than warming, and the nickel metal hydride battery is air-cooled and the fuel battery 11 is water-cooled. In the fuel battery 11 having a water-cooling device, a tank that can temporarily store cooling water in the fuel battery 11 in warming is provided to perform warming with the cooling water in the fuel battery 11 drawn out into the tank. When the fuel battery 11 is heated by the second heater 16, simply stopping the circulation of the cooling water causes extra energy to be required for the second heater 16 to also heat the cooling water. However, warming with the cooling water drawn out into the tank can reduce energy required for warming and reduce warming time.

Instead of the heating device that uses power of the power storage device, heating device for heating a power storage device only by energy other than the power storage device may be provided as a first heating device. Like the auxiliary heating device, heating device includes heating device combined with heating device that produces heat based on a secondary battery having a better output property at a low temperature than the power storage device and power thereof (for example, an electric heater), or heating device that uses no power but burns hydrogen or methanol to use the combustion heat. Heat when hydrogen is absorbed by a hydrogen absorbing alloy may be used.

The invention is not limited to the configuration where when the power generation of the fuel battery 11 is started after completion of warming, the power of the amount required for the next warming is charged into the secondary battery 13, and then the power of the fuel battery 11 is used for other purposes. The configuration may be such that the secondary battery 13 is charged at any time between the start of the power generation of the fuel battery 11 and the stop of the power generation, and power of a predetermined amount or more required for warming may be charged into the secondary battery 13 before the stop of the power generation of the fuel battery 11. For example, before the power generation of the fuel battery 11 is stopped, the amount of charge of the secondary battery 13 is detected, and when the amount of charge does not reach the amount required for warming, the power generated by the fuel battery 11 is charged into the secondary battery 13 until the amount of charge reaches the predetermined amount, and then the power generation of the fuel battery 11 is stopped. At this time, the power generated by the fuel battery 11 can be used as intended immediately after the warming is finished.

The fuel cell vehicle can start driving immediately after the warming is finished. If the amount of charge of the secondary battery 13 reaches the predetermined amount when the power generation of the fuel cell vehicle is stopped, by dump power in the fuel battery 11 during driving or charging of regeneration energy during braking, charging for the next warming may be sometimes omitted.

When only a part of the fuel battery 11 generates power, and the second heater 16 can heat only the part of the fuel battery 11, the part is not limited to the half as in the embodiment in FIG. 5. An amount of heat produced during power generation in a stack of a part that allows power generation may be equal to or higher than the amount of heat in the second heater 16. Also in this case, the same advantages as the embodiment in FIG. 5 can be obtained by stopping energization of the second heater 16 and starting power generation of the fuel battery 11 after the part of the fuel battery 11 reaches the temperature that allows power generation.

The temperature as a criterion for determination whether the control device 17 performs warming or not is not limited to 0° C. For example, as long as a fuel battery that allows power generation below freezing can be used, the temperature as a criterion for determination is below freezing.

The preset temperature is not limited to 0° C. For example, the output of the secondary battery 13 is three times higher at 0° C. than at −40° C., but is about twice higher at −20° C. and about 2.5 times higher at −10° C. Therefore, even if the preset temperature is below 0° C., the warming time is reduced, and the preset temperature is determined depending on degrees of reduction.

Turning off the first heater 15 is not limited to when the preset temperature is reached, but may be performed after the preset temperature is exceeded.

The fuel cell system 10 is not limited to a fuel cell system used as a power supply of the fuel cell vehicle, but may be a fuel cell system used as a stationary power supply for home use.

Confirmation on the secondary battery 13 being heated to the preset temperature is not limited to the confirmation by the second temperature sensor 21 that directly detects the temperature of the secondary battery 13. For example, a temperature sensor may be provided that detects an ambinet temperature where the secondary battery 13 is placed. Then, data, which is previously obtained through tests, of a relationship between the ambient temperature and energizing time of the first heater 15 required for the secondary battery 13 to reach the preset temperature may be stored in a memory, and the control device 17 may control to energize the first heater 15 for energizing time corresponding to the ambient temperature detected by the temperature sensor.

The power storage device is not limited to the secondary battery. A power supply that can repeat charging and discharging like the secondary battery may be used.

The hydrogen source of the fuel battery is not limited to the hydrogen tank in which highly compressed hydrogen gas is simply filled. For example, hydrogen may be generated and supplied by a chemical reaction from a hydrogen tank including a hydrogen absorbing alloy or a hydride.

In the embodiment in FIG. 5, when the power generation of the fuel battery 11 is started after one cell unit 31a reaches the temperature that allows power generation, use of the power generated by the fuel battery 11 is not limited to use for charging the secondary battery 13. For example, a third heater may be provided in the other stack 31b to energize the third heater. In this case, the warming time can be further reduced. The power may be used as a power supply of other devices.

The present examples and embodiments are to be considered as illustrative and not restrictive and the invention is not to be limited to the details given herein, but may be modified within the scope and equivalence of the appended claims.

The invention claimed is:

1. A warming device for fuel cell system having a fuel battery and a power storage device, comprising:
   a first heating device that heats the power storage device;
   a second heating device that heats the fuel battery by using electricity of the power storage device; and
   a control device that controls the first and second heating devices, wherein the control device is configured to, in warming of the fuel cell system, first drive the first heating device to heat the power storage device to a preset temperature without driving the second heating device, and then drive the second heating; wherein
   the first heating device has a main heating body and an auxiliary heating body, wherein the main heating body heats the power storage device with the electricity of the power storage device, and wherein the auxiliary heating body heats the storage device by using energy other than the electricity of the power storage device.

2. The warming device according to claim 1, wherein the second heating device is arranged so as to heat part of the fuel battery, and wherein the control device is configured to cause the part of the fuel battery to start generating power after the second heating device heats the part of the fuel battery to a temperature that allows power generation.

3. The warming device according to claim 2, wherein the fuel cell has a plurality of cell units that are independent from one another, and wherein, after one of the cell units reaches a temperature that allows power generation, the control device causes the one of the cells to start generating power.

4. The warming device according to claim 1, wherein the power storage device is a nickel metal hydride battery, and wherein the auxiliary heating body is driven by a storage battery with a low temperature power output which is better than that of the nickel metal hydride battery.

5. The warming device according to claim 4, wherein the storage battery is a lead-acid battery.

6. The warming device according to claim 5, wherein the fuel cell system is mounted on a vehicle, and wherein the lead-acid battery is also used as a power source for supplying power to electrical equipment of the vehicle.

7. The warming device according to claim 1, further comprising a temperature detection device for detecting a temperature of the fuel battery, wherein the control device determines whether warming of the fuel cell system is required based on the temperature of the fuel battery detected by the temperature detection device.

8. The warming device according to claim 1, wherein the second heating device is mounted to the fuel battery to heat the fuel battery directly.

9. A warming device for fuel cell system having a fuel battery and a power storage device, comprising:
a first temperature sensor that detects a temperature of the fuel battery;
a second temperature sensor that detects a temperature of the power storage device;
a first heating device that heats the power storage device;
a second heating device that heats the fuel battery by using electricity of the power storage device; and
a control device that controls the first and second heating devices, wherein the control device determines whether warming of the fuel cell system is required based on the temperature of the fuel battery detected by the first temperature sensor, wherein, when warming of the fuel cell system is required, the control device drives the first heating device to heat the power storage device without driving the second heating device, and wherein, when the temperature of the power storage device detected by the second temperature sensor reaches a preset temperature, the control device drives the second heating device to heat the fuel battery; wherein
the first heating device has a main heating body and an auxiliary heating body, wherein the main heating body heats the power storage device with the electricity of the power storage device, and wherein the auxiliary heating body heats the storage device by using energy other than the electricity of the power storage device.

10. The warming device according to claim 9, wherein the second heating device is arranged so as to heat part of the fuel battery, and wherein the control device is configured to cause the part of the fuel battery to start generating power after the second heating device heats the part of the fuel battery to a temperature that allows power generation.

11. The warming device according to claim 10, wherein the fuel cell has a plurality of cell units that are independent from one another, and wherein, after one of the cell units reaches a temperature that allows power generation, the control device causes the one of the cells to start generating power.

12. The warming device according to claim 9, wherein the power storage device is a nickel metal hydride battery, and wherein the auxiliary heating body is driven by a storage battery with a low temperature power output which is better than that of the nickel metal hydride battery.

13. The warming device according to claim 12, wherein the storage battery is a lead-acid battery.

14. The warming device according to claim 13, wherein the fuel cell system is mounted on a vehicle, and wherein the lead-acid battery is also used as a power source for supplying power to electrical equipment of the vehicle.

15. A method for controlling a warming device for fuel cell system having a fuel battery and a power storage device, comprising:
heating the power storage device to a preset temperature by using a first heating device in warming of the fuel cell system; and
heating the fuel battery with a second heating device by using electricity of the power storage device only after a temperature of the power storage device reaches the preset temperature.

16. A fuel cell vehicle that has a fuel cell system having a fuel battery, a power storage device, and a warming device, wherein the warming device includes:
a first heating device that heats the power storage device;
a second heating device that heats the fuel battery by using electricity of the power storage device; and
a control device that controls the first and second heating devices, wherein the control device is configured to, in warming of the fuel cell system, first drive the first heating device to heat the power storage device to a preset temperature without driving the second heating device, and then drive the second heating; wherein
the first heating device has a main heating body and an auxiliary heating body, wherein the main heating body heats the power storage device with the electricity of the power storage device, and wherein the auxiliary heating body heats the storage device by using energy other than the electricity of the power storage device.

* * * * *

UNITED STATES PATENT AND TRADEMARK OFFICE
CERTIFICATE OF CORRECTION

PATENT NO.      : 7,416,801 B2
APPLICATION NO. : 10/816986
DATED           : August 26, 2008
INVENTOR(S)     : Yoshihiro Isogai It is certified that error appears in the above-identified patent and that said Letters Patent is hereby corrected as shown below:

Column 1, line 38, please delete "that causes no freeze" and insert therefore -- that causes no freezing --;

Column 2, line 19, please delete "but remains producing low output" and insert therefore -- but continues to produce low output --;

Column 2, lines 32-33, please delete "which requires the fuel battery being always actuated." and insert therefore -- which requires that the fuel battery always be actuated. --;

Column 2, line 56, please delete "device for fuel cell system" and insert therefore -- device for a fuel cell system --;

Column 7, line 6, please delete "The results in FIG. 4 reveals" and insert therefore -- The results in FIG. 4 reveal --;

Column 7, lines 35-36, please delete "are electric heater, the" and insert therefore -- are electric heaters, the --;

Column 7, line 37, please delete "heating devices that burns hydrogen" and insert therefore -- heating devices that burn hydrogen --;

Column 9, line 24, please delete "device, auxiliary" and insert therefore -- device, an auxiliary --;

Column 9, lines 29-30, please delete "provided as auxiliary heating device" and insert therefore -- provided as an auxiliary heating device --;

Column 9, line 45, please delete "thus auxiliary heating device" and insert therefore -- thus an auxiliary heating device --;

Column 9, line 65, please delete "Auxiliary heating body" and insert therefore -- An auxiliary heating body --;

UNITED STATES PATENT AND TRADEMARK OFFICE
CERTIFICATE OF CORRECTION

PATENT NO.         : 7,416,801 B2
APPLICATION NO.    : 10/816986
DATED              : August 26, 2008
INVENTOR(S)        : Yoshihiro Isogai It is certified that error appears in the above-identified patent and that said Letters Patent is hereby corrected as shown below:

Column 9, line 65, please delete "Auxiliary heating body" and insert therefore -- An auxiliary heating body --;

Column 10, line 35, please delete "have cooling device" and insert therefore -- have a cooling device --;

Column 10, line 49, please delete "storage device, heating device" and insert therefore -- storage device, a heating device --;

Column 10, lines 52-53, please delete "heating device, heating device includes heating device combined with heating device" and insert therefore -- heating device, a heating device includes a heating device combined with a heating device --; and

Column 10, line 56, please delete "or heating device that uses" and insert therefore -- or a heating device that uses --.

In Claim 1, column 12, line 29, please delete "the second heating; wherein" and insert therefore -- the second heating device; wherein --; and In Claim 16, column 14, line 32, please delete "the second heating; wherein" and insert therefore -- the second heating device; wherein --.

Signed and Sealed this

First Day of September, 2009

David J. Kappos
*Director of the United States Patent and Trademark Office*